(No Model.)
E. H. JOHNSON.
ELECTRICAL CONTROLLING AND OPERATING APPARATUS.
No. 435,897. Patented Sept. 2, 1890.
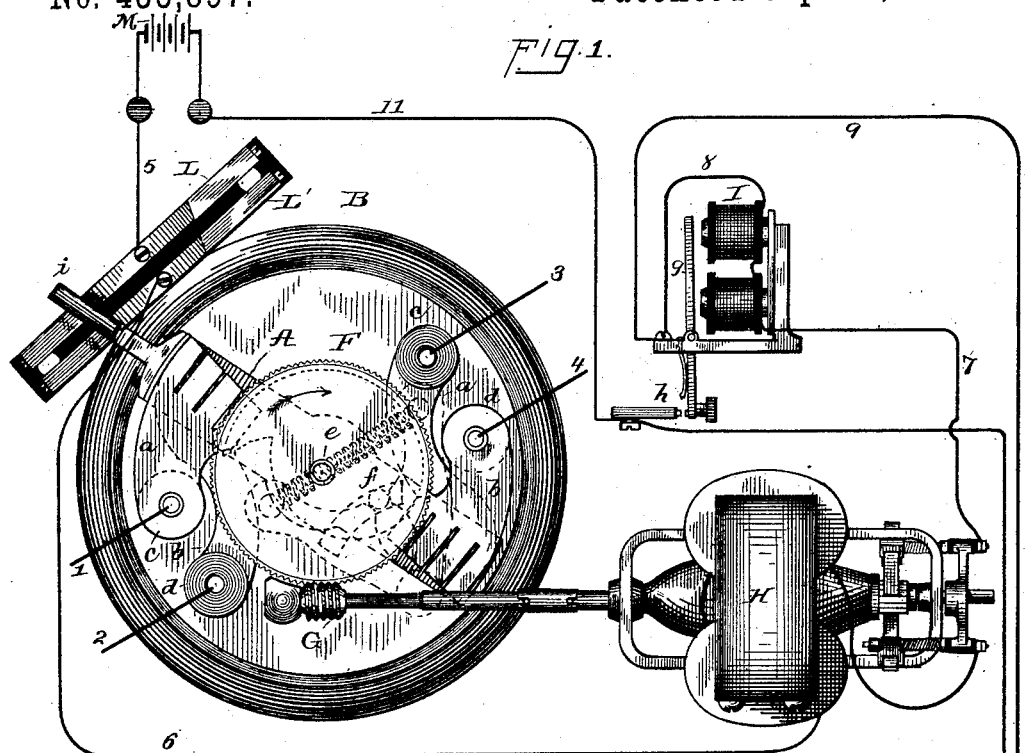
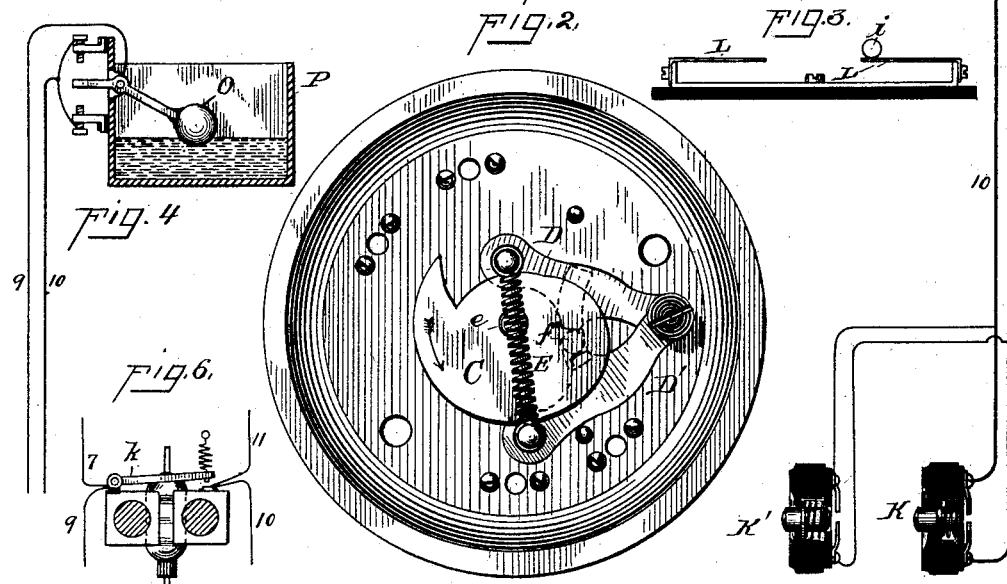
WITNESSES:
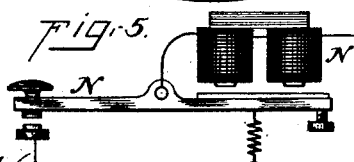
INVENTOR
Edward H. Johnson,
BY Dyer & Seely
ATTORNEYS.

UNITED STATES PATENT OFFICE.

EDWARD H. JOHNSON, OF NEW YORK, N. Y., ASSIGNOR TO THE INTERIOR CONDUIT AND INSULATION COMPANY, OF SAME PLACE.

ELECTRICAL CONTROLLING AND OPERATING APPARATUS.

SPECIFICATION forming part of Letters Patent No. 435,897, dated September 2, 1890.

Application filed October 19, 1887. Serial No. 252,801. (No model.)

*To all whom it may concern:*

Be it known that I, EDWARD H. JOHNSON, of the city of New York, in the county and State of New York, have invented a certain new and useful Improvement in Electrical Controlling and Operating Apparatus, of which the following is a specification.

The object I have in view is to produce simple and efficient electrically operated or controlled apparatus for doing work of any character, such as the moving of a switch for opening and closing a circuit carrying heavy currents and used for operating various forms of electrical apparatus, as electric motors or lamps, or such as for directly working moving parts, as the steam, water, or air valves or registers of house-heating apparatus, or for moving railway-signals or other similar apparatus.

In particular my object is to enable the setting in operation of my electrical controlling or operating apparatus by means acting with delicacy or uncertainty and not of itself suitable for maintaining the circuit during the operation of the apparatus, such as a push-button, a thermostat, a float, a galvanometer, a steam or water gage, or other delicately-working indicator. My apparatus is designed to respond to the action of such delicate apparatus and to close within itself its own working-circuit, (and in so doing preferably cutting out of circuit the controlling push-button or indicator,) and also breaking its own circuit when the work is completed and setting the parts in condition, to be again under the control of the push-button or other device.

A further object is to produce such an arrangement and relation of the parts as to enable the controlling or operating apparatus to be set in operation from two or more different points by two or more push-buttons or other controlling devices.

The invention consists in the several novel devices and combinations hereinafter described, and pointed out by the claims.

In the accompanying drawings, forming a part hereof, Figure 1 is a top view of the apparatus with the circuit-connections in diagram, the controlling push-buttons being shown in section; Fig. 2, a bottom view of the snapping movement forming part of the apparatus; Fig. 3, a side view of the circuit-breaker worked by the snapping movement; Fig. 4, a view illustrating a float used as a substitute for the push-button; Fig. 5, a view showing a modified arrangement of the circuit-maintaining magnet; and Fig. 6, a view, on a small scale, showing the circuit-maintaining armature worked by the field-magnet of the electric motor.

My apparatus consists, essentially, of one or more push-buttons or other controlling devices, a circuit-maintaining magnet or armature, an electric motor, a spring snapping movement or mechanism, in which power is gradually stored up by the electric motor and which acts suddenly when released, a circuit-breaker which is worked by the snapping movement and breaks the circuit of the electric motor and circuit-maintaining magnet at each operation of the snapping movement, and an arm or other moving part worked by the snapping movement and carrying switch-contacts or connected with the object to be operated. As the invention is illustrated, this arm A carries the moving contacts of a double-pole electrical switch, the sets of stationary contacts $a\,b$ extending from posts $c\,d$, mounted on a base B, and from which posts run the circuit-connections 1 2 and 3 4. In the position shown in the drawings the two sets of contacts $a\,b$ are bridged by the contacts of the arm and the circuit is closed on both sides. When the arm A is in its opposite position, the circuit will be opened on both sides.

As will be understood from what has been already stated, the arm A, instead of carrying electrical contacts, can be connected mechanically with any object that it is desired to move.

The spring snapping movement by which the arm A is thrown is that invented by S. Bergmann and John F. Dempster, and described in an application for patent made by them on electrical switches. It is therefore not considered necessary to describe such movement fully herein. In brief, it is composed of a cam C, having a gradual rise and a sharp radial drop and fixed to a spindle $e$, rising centrally through the base B, the cam being beneath the base. Two pivoted arms D D' bear by studs at their free ends on the periphery of the cam and are drawn together on it by a strong spring E. The arms D D' have projections extending upwardly into a slot in the base and embrace a pin $f$, extending downwardly from the under side of the arm A, the arm being sleeved on the spindle $e$. The spindle being turned in the direction shown by the arrows in Figs. 1 and 2, the arm A will be thrown suddenly first in one direction and then in the other as the studs on the free ends of the pivoted levers alternately drop off of the point of the cam.

To the head of the spindle $e$ is fixed a worm-wheel F, with which engages a worm G on the shaft of an electric motor H.

I is the circuit-maintaining magnet, closing circuit by its armature $g$ at its front contact $h$.

K is a controlling push-button.

L L' are a pair of spring-contacts, which are bridged by the end $i$ of the arm A at each end of its movement, such arm at the center of its movement being free from contact with such springs. The source of electrical energy for operating the device is shown at M. It may be a galvanic battery or a connection with the conductors of an electric light or power system or circuit. The circuit extends by conductor 5 from the source M to the spring L, thence by the end $i$ of the arm A to the spring L', thence by conductor 6 to the field and armature of the electric motor H, thence by conductor 7 to the coils of the circuit-maintaining magnet I, thence by wire 8 to the armature $g$ of such magnet, thence by wire 9 to the push-button K, thence by wire 10 to the front contact $h$ of the armature $g$ of the magnet I, and thence by wire 11 back to the source M. Now the circuit being closed at the push-button K, the circuit-maintaining magnet I attracts its armature $g$, drawing it against the contact $h$, thus cutting out or short-circuiting the push-button and the loop formed by the wires 9 10. The coils of the magnet I still remain in circuit, however, maintaining a good closure of the circuit between $g$ and $h$. The electric motor H, receiving the current at the same time as does the magnet I, starts and turns the worm-wheel F, storing up power in the spring E until the point of the cam passes under a stud on one of the pivoted arms D D', when the spring is released and throws the arm A to the opposite limit of its movement. In making this movement the end $i$ of the arm A passes from one elevated end of the springs L L' to the other, and in doing so opens the circuit for an instant, which causes the magnet I to release its armature $g$, which separates from the contact $h$. Thus the circuit is opened at the contact $h$ and the motor stops. The arm A bridges the springs L L' at each end of its movement, but it does not act quick enough to prevent the magnet I from acting. Thus the motor is stopped, but the circuit is restored at the springs L L', so that the parts are in position to be again set in operation by depressing the push-button. As many other push-buttons K' can be connected with the wires 9 10 as may be desired the one circuit-maintaining magnet only being required. The circuit-maintaining magnet may be arranged to act directly upon the controlling device and to hold the circuit firmly closed at that point. This is shown in Fig. 5, the circuit-controlling device being a lever N, upon which the magnet N' acts directly. The circuit 12 13 in the case of this modification will run on one side directly to the source M and on the other side to such source through the electric motor and the circuit-breaker composed of the springs L L' and the end $i$ of the arm A.

Another modification of the circuit-maintaining magnet within the scope and spirit of my invention is to utilize the field-magnet of the electric motor for this purpose. This is shown in Fig. 6, wherein a spring-retracted armature $k$ is mounted upon the poles of the field-magnet and cuts out the wires 9 10 at its front contact.

In Fig. 4 is shown a float O as the controlling device, taking the place of the push-button. It closes the circuit through the wires 9 10 at each limit of its movement, and, operating the switch, will start and stop an electric motor supplying water to the tank P. This is shown simply as one of the many circuit-controlling devices which can be substituted for the push-button.

What I claim is—

1. In an electrically-operated controlling or operating apparatus, the combination, with a circuit-controller, of a magnet maintaining the circuit after once established by the circuit-controller, an electric motor in circuit with said magnet, moving parts worked by said motor, and a circuit-breaker operated by such moving parts and breaking the circuit through said magnet, substantially as set forth.

2. In an electrically-operated controlling or operating apparatus, the combination, with a circuit-controller, of a magnet maintaining the circuit after once established by the circuit-controller, an electric motor in circuit with said magnet, a spring snapping movement worked by said motor, and a circuit-breaker operated by the snapping movement and breaking the circuit through said magnet, substantially as set forth.

3. In an electrically-operated controlling or operating apparatus, the combination, with a circuit-controller, of a magnet maintaining the circuit after once established by the circuit-controller, an electric motor in circuit with said magnet, a spring snapping movement worked by said motor, and a circuit-breaker composed of contacts through which the circuit is broken during the operation of the snapping movement, but at which the circuit is closed at the limits of throw of such snapping movement, substantially as set forth.

4. The combination, with an electric switch having contacts for opening and closing a circuit, of an electric motor for working such switch, a circuit-controller, a circuit-maintaining magnet, and a circuit-breaker operated by movement of the switch, substantially in the manner and for the purpose set forth.

5. The combination, with an electric switch having contacts for opening and closing a circuit, of a snapping movement for throwing the switch, an electric motor working the snapping movement, a circuit-controller, a circuit-maintaining magnet, and a circuit-breaker, substantially as set forth.

6. The combination, with an electrical switch, of a motor working the same, two or more push-buttons or other circuit-controllers controlling the circuit of such motor, a circuit-maintaining magnet, and a circuit-breaker operated by movement of the switch, substantially as set forth.

This specification signed and witnessed this 5th day of October, 1887.

EDWD. H. JOHNSON.

Witnesses:
WILLIAM PELZER,
E. C. ROWLAND.